Sept. 11, 1956

J. C. FORTIS 2,762,187

LAWNMOWER CLIPPER ATTACHMENT

Filed Jan. 26, 1954

INVENTOR.
John C. Fortis
BY
McMorrow, Berman & Davidson
ATTORNEYS

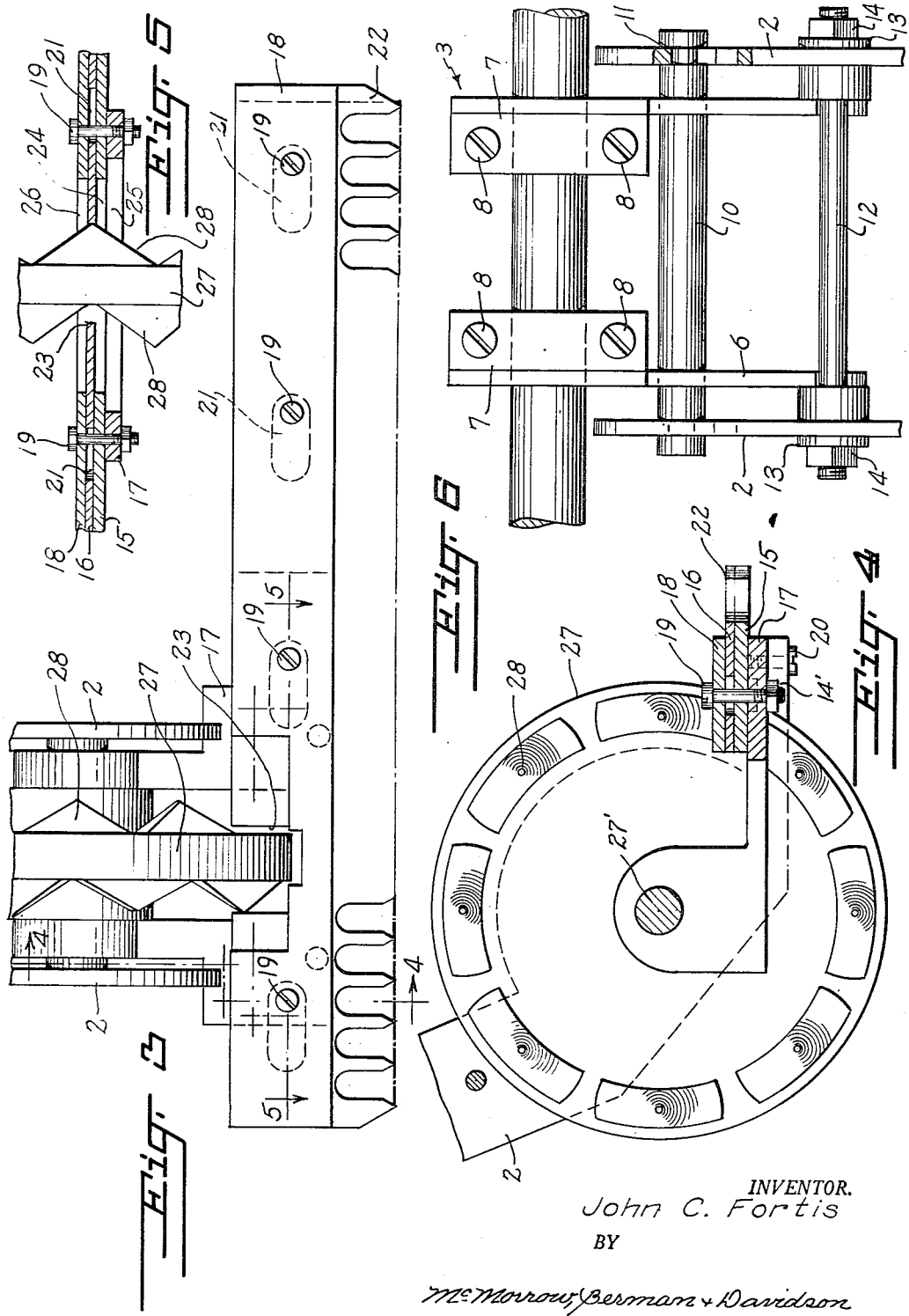

United States Patent Office 2,762,187
Patented Sept. 11, 1956

2,762,187

LAWNMOWER CLIPPER ATTACHMENT

John C. Fortis, Clifton, N. J.

Application January 26, 1954, Serial No. 406,299

2 Claims. (Cl. 56—238)

This invention relates to an improved clipper attachment for conventional type lawnmowers.

An object of the invention is to provide an improved clipper attachment for lawnmowers which is adapted to cut closely to upstanding objects, such as walls or trees, and to cut under low lying shrubbery in places which cannot be reached by the regular cutting mechanism of the conventional mower.

Another object of the invention is to provide an improved clipper attachment for lawnmowers which is adapted to cut grass too tall for the regular cutting mechanism of a conventional mower.

Another object of the invention is to provide an improved clipper attachment for lawnmowers which may easily and quickly be mounted upon and dismounted from the mower, which may be positioned so as to cut in line with, or to one side of the cutting mechanism of the mower, and which, when mounted, may be adjusted to cut at different levels above the ground.

Other objects and advantages of the invention will appear in the course of the following description considered in conjunction with the attached drawings, in which:

Figure 3 is a fragmentary detail view, on an enlarged scale, of the clipper mechanism and adjacent portions thereof.

Figure 4 is a transverse vertical section taken along the line 4—4 of Figure 3.

Figure 5 is a fragmentary vertical longitudinal section taken along the line 5—5 of Figure 3.

Figure 6 is a fragmentary front elevation, on an enlarged scale, of the hanger means by which the attachment is mounted on a lawnmower.

Figure 1:
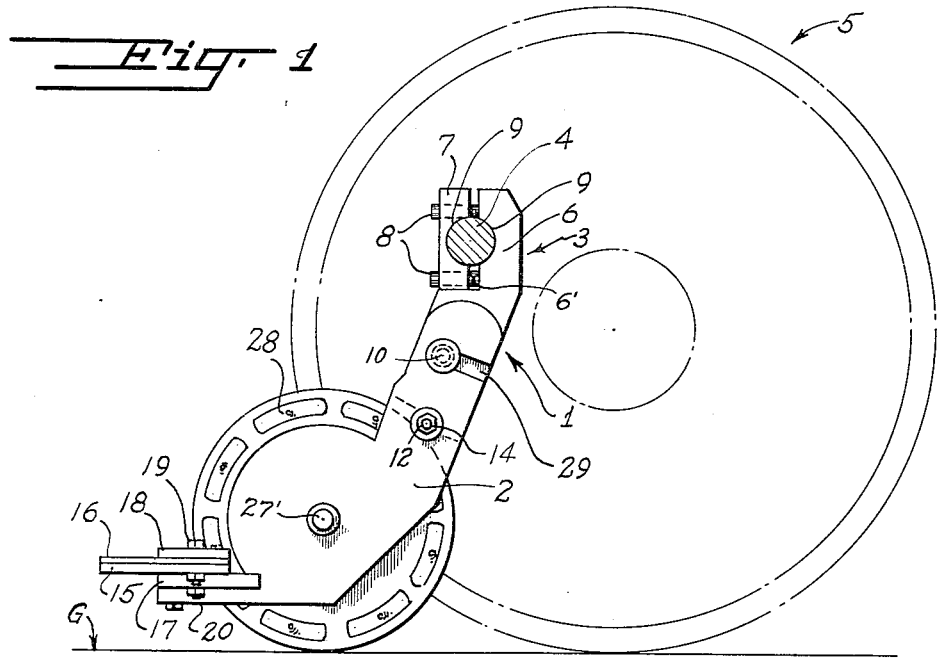
Figure 1 is a side elevational view of an attachment of the present invention shown mounted on a conventional lawn mower.
Figure 2:
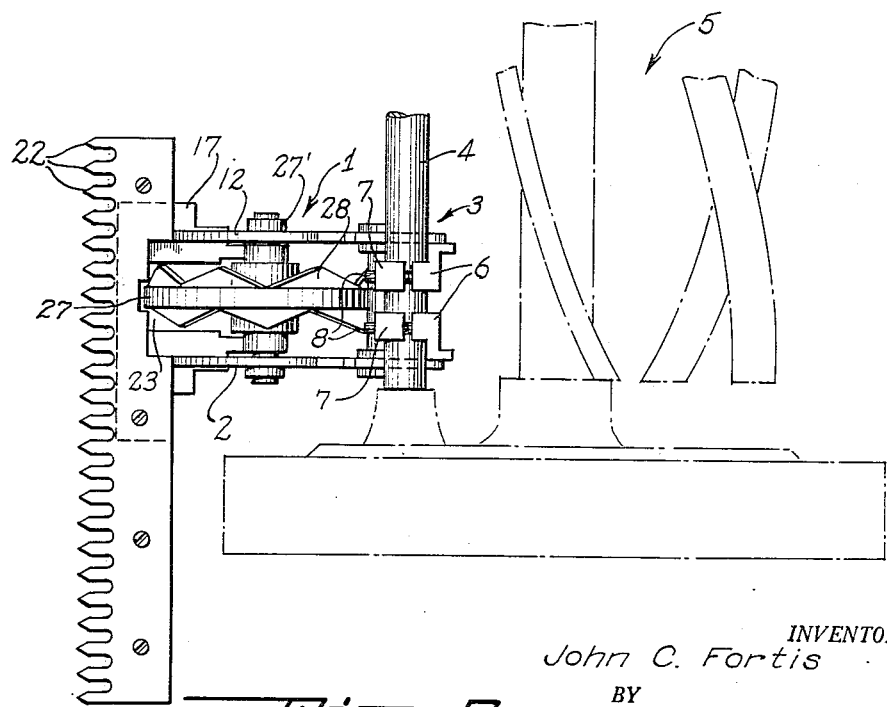
Figure 2 is a fragmentary plan view of the assembly of Figure 1.

Referring now to the drawings in more detail, the illustrated attachment comprises a frame 1, including a pair of spaced uprights 2, and a hanger assembly 3, for attachment to a cross bar 4 of a lawnmower 5. The hanger assembly 3 consists of a pair of vertically elongated flat bars 6 traversed at a point intermediate their ends by a pin 10. A jaw 7 is connected to the upper end portion of each of the bars 6 by means of bolts 8. The upper end portion of each bar 6 is provided with a notch 6' having semicircular indentation 9 facing a similar indentation in the complemental jaw 7 for embracingly engaging the mower cross bar 4. The lower portions of the bars 6 are located between and overlap the upper portions of the uprights 2. The pin 10 is provided with reduced portions 11 on its ends and each upright 2 is rockably supported upon the related reduced portion 11 by means of a conformably sized notch 29 extending inwardly from the rearward edge of the upright 2 adjacent its upper end. A horizontally disposed bolt 12 has threaded ends which extend through the uprights 2 at points adjacent to and spaced below the pin 10 and these ends are threadably engaged by nuts 14 outside of the uprights and bearing against washers 13. The lower end portions of the bars 6 extend below and abut the bolt 12 from the rear.

A lower horizontally disposed fixed clipper blade 15 is positioned transversely of the uprights 2. An upper movable clipper blade 16 is superimposed upon the lower blade 15 for longitudinal reciprocating movement with respect to the blade 15, and the two blades are held between the lower guide plate 17 and an upper guide plate 18 by means of bolts 19, the lower guide plate 17 being in turn secured to the arms 14' of the uprights 2 by means of bolts 20. The upper blade 16 receives the bolts 19 in longitudinally extending slots 21 which permit the blade 16 to have limited reciprocatory movement between the upper guide plate 18 and the blade 15. The cutting edges of the clipper bades 15 and 16 extend forwardly of the guide plates 17 and 18 and are provided with teeth 22, the teeth of the blade 16 acting in shearing relation with respect to the teeth of the blade 15 when the blade 16 is reciprocated longitudinally. The blade 16 has a slot 23 extending inwardly from its rearward edge intermediate the ends thereof, and the blade 15 and guide plates 17 and 18 have slots 24, 25 and 26, respectively, which are longer than and overlie the slot 23.

A rotatable wheel 27 adapted to roll upon a ground surface G is positioned between and journaled on a shaft 27' secured to and extending between the uprights 2 and has its peripheral portion extending into the slot 23 of the upper blade 16. A circular cam track 28, embodying a series of alternate lobes and dwells projects from each side of the peripheral portion of the wheel 27 in concentric relation therewith, the lobes of one track being alternately arranged with respect to the lobes of the other track. Thus, upon rotational movement of the wheel 27, the lobes of the opposite tracks alternately engage the adjacent side edges of the slot 23 to cause reciprocating movement of the blade 16.

It is apparent from the foregoing that the hanger assembly 3 of the attachment of the present invention may be connected at any point along the cross bar of a lawnmower. It may be so positioned that the clipper blades will lie directly in the cutting path of the lawnmower, in which position they will serve to cut high grass and weeds which the rotary cutting element of the mower cannot cut, or they may be positioned in echelon with respect to the cutting element of the lawnmower, in order to cut grass close to a wall or under shrubbery which the cutting element of the lawnmower cannot reach. By setting the hanger assembly 3 upon the cross bar 4 at a greater angle with respect to the vertical, the uprights 2 will be shifted so as to tilt the clipper blades upwardly, causing them to cut at a level higher above the ground. By setting the hanger assembly so that it makes a smaller angle with the vertical, the clipper blades will be tipped downwardly and will cut closer to the ground. The clipper attachment may be quickly and easily removed from the lawnmower at any time by simply lifting the uprights 2 from their engagement upon the pin 10, leaving the hanger assembly 3 connected to the cross bar 4 for use when the clipper attachment is next needed.

What is claimed is:

1. In a clipper attachment for a lawn mower, a frame comprising a pair of laterally spaced uprights, jaw means on said uprights for securing the frame to a cross bar of a mower, rigid arms projecting from the uprights beneath said jaw means, a transverse horizontal lower guide plate mounted upon said arms, a lower stationary clipper blade superimposed upon said lower guide plate, an upper movable clipper blade slidably superimposed upon said lower blade, means securing said movable blade reciprocably in place, an upper guide plate superimposed upon said upper movable blade, means connected between said upper and lower guide plates precluding relative movement of said upper and lower guide plates, said upper and lower guide plates having registered longitudinal slots and said upper movable blade having a notch overlying said longitudinal slots, said notch having opposed side edges, a shaft extending between and secured to said uprights, a ground engaging wheel journaled on said shaft and having a peripheral portion located in said notch and between the side edges of the notch, and cam rings on opposite sides of said peripheral portion of the wheel arranged to bear against the side edges of the notch as the wheel is rotated so as to reciprocate said upper movable blade relative to the fixed lower blade.

2. In a clipper attachment for a lawn mower, a frame comprising a pair of laterally spaced uprights, jaw means on said uprights for securing the frame to a cross bar of a mower, rigid arms projecting from the uprights beneath said jaw means, a transverse horizontal lower guide plate mounted upon said arms, a lower stationary clipper blade superimposed upon said lower guide plate, an upper movable clipper blade slidable superimposed upon said lower blade, means securing said movable blade reciprocably in place, an upper guide plate superimposed upon said upper movable blade, means connected between said upper and lower guide plates precluding relative movement of said upper and lower guide plates, said upper and lower guide plates having registered longitudinal slots and said upper movable blade having a notch overlying said longitudinal slots, said notch having opposed side edges, a shaft extending between and secured to said uprights, a ground engaging wheel journaled on said shaft and having a peripheral portion located in said notch and between the side edges of the notch, and cam rings on opposite sides of said peripheral portion of the wheel arranged to bear against the side edges of the notch as the wheel is rotated so as to reciprocate said upper movable blade relative to the fixed lower blade, said jaw means comprising vertically elongated bars having upper and lower ends, jaw elements on the upper ends of the bars, and pin and notch means separably connecting the lower ends of said bars to said uprights.

References Cited in the file of this patent
UNITED STATES PATENTS

| | | |
|---|---|---|
| 534,187 | Zohe | Feb. 12, 1895 |
| 2,190,578 | Todd | Feb. 13, 1940 |
| 2,509,080 | Banks | May 23, 1950 |
| 2,682,471 | Shuler | July 6, 1954 |